United States Patent [19]

Greco et al.

[11] Patent Number: 5,488,650
[45] Date of Patent: Jan. 30, 1996

[54] CONFIGURABLE TELEPHONE INTERFACE FOR ELECTRONIC DEVICES

[75] Inventors: Robert C. Greco; Brian J. Gore, both of Seattle, Wash.

[73] Assignee: Active Voice Corporation, Seattle, Wash.

[21] Appl. No.: 940,614

[22] Filed: Sep. 4, 1992

Related U.S. Application Data

[63] Continuation-in-part of Ser. No. 764,628, Sep. 24, 1991, abandoned.

[51] Int. Cl.[6] .................................................. H04M 1/32
[52] U.S. Cl. .............................. 379/67; 379/89; 379/97; 379/201
[58] Field of Search ............................. 379/67, 88, 89, 379/97, 201

[56] References Cited

U.S. PATENT DOCUMENTS

| | | | |
|---|---|---|---|
| 4,602,129 | 7/1986 | Matthews | 379/88 |
| 4,625,081 | 11/1986 | Lotito | 379/88 |
| 4,736,405 | 4/1988 | Akiyama | 379/67 |
| 4,932,021 | 6/1990 | Moody | 379/88 |
| 5,008,926 | 4/1991 | Misholi | 379/89 |

FOREIGN PATENT DOCUMENTS

| | | |
|---|---|---|
| 197648 | 10/1986 | European Pat. Off. . |
| 382670 | 8/1990 | European Pat. Off. . |
| WO89/02250 | 12/1989 | WIPO . |

OTHER PUBLICATIONS

Applied Voice Technology, The product=CALLXPRESS Teleconnect Magazine, Sep. 1987 vol. 5 Issue 9, pp. 136 & 138.

Ntz Nachrichtentechnische Zeitschrift, vol. 41, No. 4, Apr. 1988, Berlin DE pp. 226–229.

H. Hackstein et al 'Das, Sprachspeichersystem fur die DBP', see p. 228, middle column, line 5—p. 229, left column, line 16. publication date=1988.

Repartee Training Guide by Active Voice, 1988.

1982 Int'l Zurich Seminar on Digital Communications, entitled Prospects For Voice Signalling in the Telephone Network, by Cheeseman, Mar. 9, 1982.

*Primary Examiner*—Jeffery Hofsass
*Assistant Examiner*—Fan Tsang
*Attorney, Agent, or Firm*—Graybeal Jackson Haley & Johnson

[57] ABSTRACT

A system for easily creating a menu structure for the control of an electronic device via a telephone is disclosed. The system contains an editor for easily creating a menu structure design, a memory table for containing the parameters of the menu structure design, and a logic engine for implementing the menu structure design according to the memory table. The use of a memory table to define each menu structure allows multiple menu structures to be available for execution by the engine and allows switching between them. It also allows certain user inputs to be defined as short cuts to reach other portions of the menu structure.

22 Claims, 3 Drawing Sheets

CONFIGURABLE TELEPHONE INTERFACE FOR ELECTRONIC DEVICES

This application is a continuation-in-part of U.S. patent application Ser. No. 07/764,628, filed Sep. 24, 1991 now abandoned, entitled CONFIGURABLE TELEPHONE INTERFACE FOR ELECTRONIC DEVICES.

BACKGROUND

Beginning first with telephone answering devices, many devices are now available in the market place which allow a person connected by telephone to the device to generate touchtones which are interpreted by the device and which cause the device to take one or more of many actions or features. Examples include automated attendant switchboard systems which allow the caller to specify which person or department he or she wishes to reach, voice messaging systems which allow the device owner or callers to record and retrieve messages, audio information services which allow a caller to access recorded messages with different kinds of information or have the device fax to the caller information in printed form, and remote controllers for electronic components which allow the component to be operated remotely via a telephone connection.

Each of these devices presents the user with a set of menus, each menu containing choices which may be selected by entering touchtone commands at the caller's telephone. Most of these devices play for the caller prompts, which are prerecorded messages informing the caller of his or her options. If the number of features available in the device is small, all of the features can be presented at one time and there will be only one menu. Often, the features will be organized in a hierarchy of menus with certain features grouped together in a sub-menu which can be accessed by a selection from the menu at the level above. Unless there are only two features available to a caller, the features can always be organized in a hierarchy of menus. Typically, there are many possible structures for this hierarchy. For example, the hierarchy can be organized such that no more than two options are presented at any one time, such as, "yes" or "no". This creates a menu system which is very easy to understand and navigate, but it requires passing through many levels before the desired end result feature is reached.

As electronic devices which can be controlled through a telephone have become more complex, the number of features has proliferated, creating very complex menu structures. To make navigation of these menus easier, some devices present the caller with a choice of different sets of menus for beginners and advanced users. Typically, the beginner's set of menus has long and detailed prompts while the advanced user's set of menus has terse, cryptic prompts. Also, the advanced user's set of menus may offer more features than the beginner's set of menus. In addition, some devices allow the use of certain touchtones to go back to the previous level of the menu hierarchy or to escape the menu hierarchy and return to the first level.

The above beginner/advanced menu structures have a subset/superset relationship. As discussed herein a first set of menus is a subset of a second set of menus if the only changes are the wording of the prompts and the addition of choices in menus of the second set of menus that were not available in the first set of menus. If the one or more menus of the first and second set each have choices different from the choices in the corresponding menu of the other set then the two sets of menus have no subset/superset relation.

In addition, some devices define a certain key stroke or sequence of key strokes %o invoke a "help" recording. Typically, the recording that is played when help is invoked depends upon the menu prompt that was last played and contains an elaboration of the information in the prompt.

Once the logic control for a device has been programmed to implement a particular set of menus, reprogramming the interface to implement a different set of menus requires essentially the same process and the same technical understanding as the programming of the original design.

A typical logic sequence, which is written in a computer programming language, works like this:
1. play prompt: the standard greeting.
2. play prompt: To check your messages, press 1; to record a message, press 2; to change your setup, press 3.
    (a) If touchtone 1 pressed: play prompt: you have_new messages. To play new messages, press 1, to play old messages, press 2, to return to main menu, press *.
        (i) If touchtone 1 pressed: play prompt: to exit playing of messages, press *, to delete a message, press #; play new messages.
        (ii) If touchtone 2 pressed: play prompt: to exit playing of messages, press *, to delete a message, press #; play old messages.
        (iii) If touchtone * pressed: return to step 2.
        (iv) If any other or no touchtone is pressed, return to step 2.
    (b) If touchtone 2 pressed: play prompt: Record your message. When you have finished recording, press 1.
        (i) If touchtone 1 pressed: play prompt: enter the box number of the person to receive your message.
            (1) If touchtones are pressed, record #, send message, and return to step 2.
            (2) If no touchtones are pressed, return to step (i), and if no touchtones are pressed again, return to step 2.
        (ii) If any other or no touchtone is pressed, return to step (b), and if any other or no touchtone is pressed again, return to step 2.
    (c) If touchtone 3 pressed: play prompt: To change your greeting, press 1; to turn on message forwarding; press 2; to turn off message forwarding, press 3.
        (i) If touchtone 1 pressed: play prompt: Record new greeting. When you have finished recording, press 1.
            (1) If touchtone 1 pressed: play prompt: to listen to your greeting, press 1; to return to main menu, press *.
                (A) If touchtone 1 pressed: play greeting.
                (B) If touchtone * pressed: return to step 2.
                (C) If any other or no touchtone is pressed, return to step (1), and if any other or no touchtone is pressed again, return to step 2.
            (2) If any other or no touchtone is pressed, return to step (i), and if any other or no touchtone is pressed again, return to step 2.
        (ii) If touchtone 2 pressed: play prompt: Message forwarding now on; return to step 2.
        (iii) If touchtone 3 pressed: play prompt: Message forwarding now off; return to step 2.
        (iv) If any other or no touchtone is pressed, return to step (c), and if any other or no touchtone is pressed again, return to step 2.
    (d) If any other touchtone or no touchtone pressed: return to step 2, and if any other or no touchtone is pressed again, play prompt: Goodbye; and exit.

In the example above, each time the words "play prompt" appear, a new menu is presented to the user. Two of those menus, the first and the last, do not call for any action by the user. The program logic simply continues after the prompt is played. Notice that 13 menus are contained in the above example. Many actual contemporary systems employ more than 30 menus. If each menu requires an average of 8 lines of computer program code to implement, the total set of menus will require 240 lines of code. In the above example, there are 22 logical steps. Programming this example in a programming language would require many more than 22 lines of code.

In the prior art, when a set of menus like the above example is programmed, the programmer implements each of the logic steps in the listed sequence by writing lines of code to implement each step. An implementation of the above example will contain a command for "play prompt" thirteen times, once for each time a prompt is to be played. Likewise, the implementation will contain a sequence of code which represents "if any other or no touchtone is pressed, return to step 2" seven times.

The programming or modification of a set of menus is very complicated. It requires a skilled programmer to write the original lines of computer program code or to change the lines of code. To change the recording of a particular prompt simply requires changing a sound recording stored at a particular address in the system. This is easy for the user to do. However, to change the structure of the menus, to move a feature option from one menu to another, to break a long menu into two short menus, or to give the user another exit point in the menu structure, is very difficult and complicated. When a set of menus is created or modified, great attention must be paid to each detail to be sure that all possible branches are considered. Otherwise, the program will not function correctly if an unspecified touchtone is selected.

SUMMARY OF THE INVENTION

The basic components of the disclosed invention constitute a system for creating and operating menu structures for any logic device that can be operated via a telephone. The system allows the owner and/or user of the device to easily design any desired set of menus with any desired recordings of prompts to create an interface which is particularly suited to the needs of that owner or user. This system allows the owner or user of the device to create such sets of menus without knowing how to generally program the logic means contained within the device.

The system assigns to each menu a certain number and allows any touchtone selection, or no touchtone selection, to cause the execution of an action, which may be a feature, and then invoke any other menu number within the system. A set of menus is designed by specifying all the parameters for each menu in the set.

Figure 2:
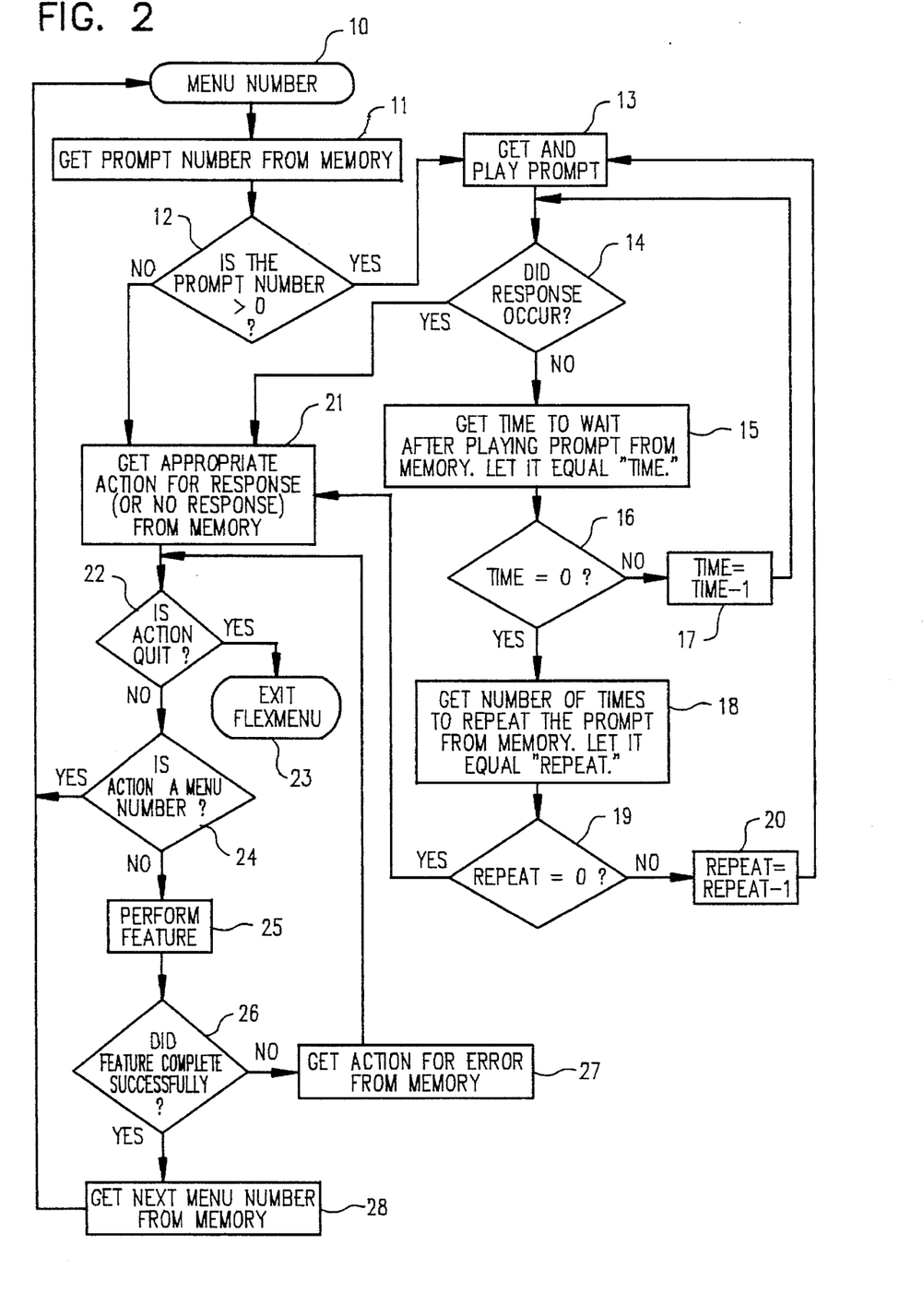
FIG. 2 is a flow chart showing the steps of the menus logic.

The logic sequence is programmed only once for implementation of all menus of a set and any other conceivable menu. The flow chart for this logic sequence is shown in FIG. 2. Creation of additional menus does not require the keying or copying of any programming commands. Instead, to create an additional menu, an additional line of numbers is added to a table such as Table 2, below. Consequently, menus can be modified or added by a user who does not understand programming and does not even know what a programming command is, let alone how to write one.

Also, it is very easy to create alternative sets of menus. In the prior art programming technique, creation of a set of menus, such as the set of thirteen menus shown in the example above, is a tedious and detailed process. A complete set of menus for a user interface will typically have approximately 30 menus. To create a custom set of menus for each user of the system who would like the system to operate differently from the standard method of operation would require a skilled programmer and would be prohibitively labor intensive. However, the technique of the present invention allows any number of alternative sets of menus to be easily created. This allows the creation of a system which presents a different set of menus to each user based on the identification of the user, or a system which has an initial master menu giving the user a choice of menu set A or menu set B.

(1) data and logic are not mixed in a single long sequence but are rather separated, and (2) the logic sequence is stated only once and the data to implement each menu is retrieved and used by the logic sequence when the menu is implemented. This allows a particular menu, or a set of menus, which is simply a table of numbers, to be edited with a simple editor that works much like a spread sheet program as used by a bookkeeper and does not require the editing of lines of programming commands as written by a programmer. It also allows the use of alternative sets of menus, the choice between sets of menus being made either by the system or by the user. In all prior art systems, however complex the set of menus may be, there is only one set of menus available to each user.

Two or more alternate sets of menus can be created and each user can be given a choice of which set of menus he wishes to use. The choice can be presented once when the user is first set up on the system. Or, the choice can be presented each time the user calls, as an initial choice which selects the set of menus to be followed for the remainder of the call. Or, the user can be given the option of switching from one set of menus to the other at any time during the navigation of the menus. Or, the user can be allowed to switch from one set of menus to another and back again at any time as desired by the user.

Another aspect of the invention allows one or more keys which are not otherwise used as options for the menu system to be designated as "speed" keys. Speed keys can be defined to jump ahead in the normal menu hierarchy directly to certain desired features or results. One of the speed keys can also be a "help" key. When the help key is pressed, the user is presented with a prompt describing a].1 of the options available to the user, particularly including the speed keys. The selection of which keys are speed keys and what results they achieve can be easily modified by the user.

DETAILED DESCRIPTION OF THE PREFERRED EMBODIMENT

Figure 1:
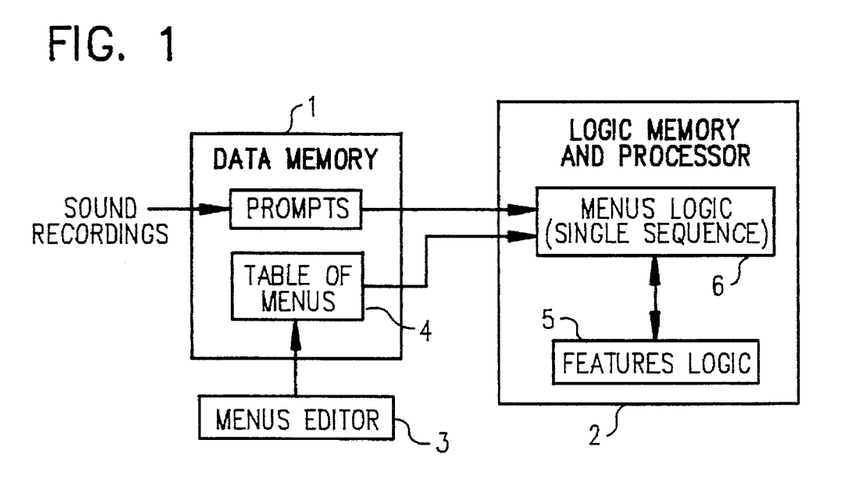
FIG. 1 is a block diagram showing the components of the preferred embodiment and the relationships between them.

The present invention has three main elements: the data memory 1, the logic memory and processor 2, and an editor 3 for building and modifying the menus. The data memory 1 stores all the parameters for one or more sets of menus 4, each of which can be custom tailored to suit each user. Each menu gives the user a plurality of choices and details how the user's response is to be acted upon. The logic memory and processor 2 acts upon the user's response or upon the user's failure to respond.

Figure 4:
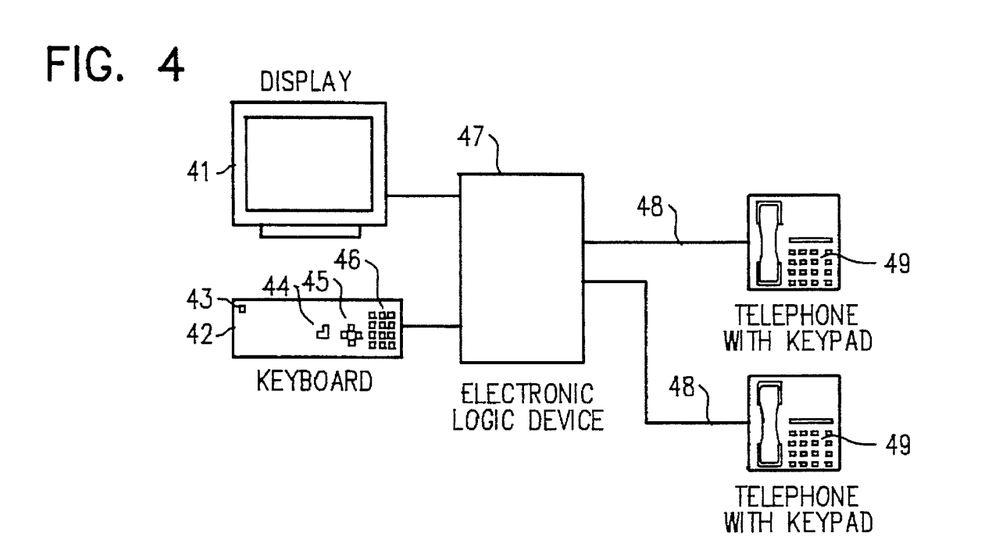
FIG. 4 shows the system hardware.

Additional memory in the electronic device 47 contains a predefined set of features logic instructions 5 for features that the device can perform. By executing these features, the device can receive user input or ignore user input if it is nonsensical. It can perform internal actions, such as querying and updating a database of information, or it can perform external interactive actions, such as recording and playing messages 13. See Table 1 below for a list of feature options for the preferred embodiment.

Figure 3:
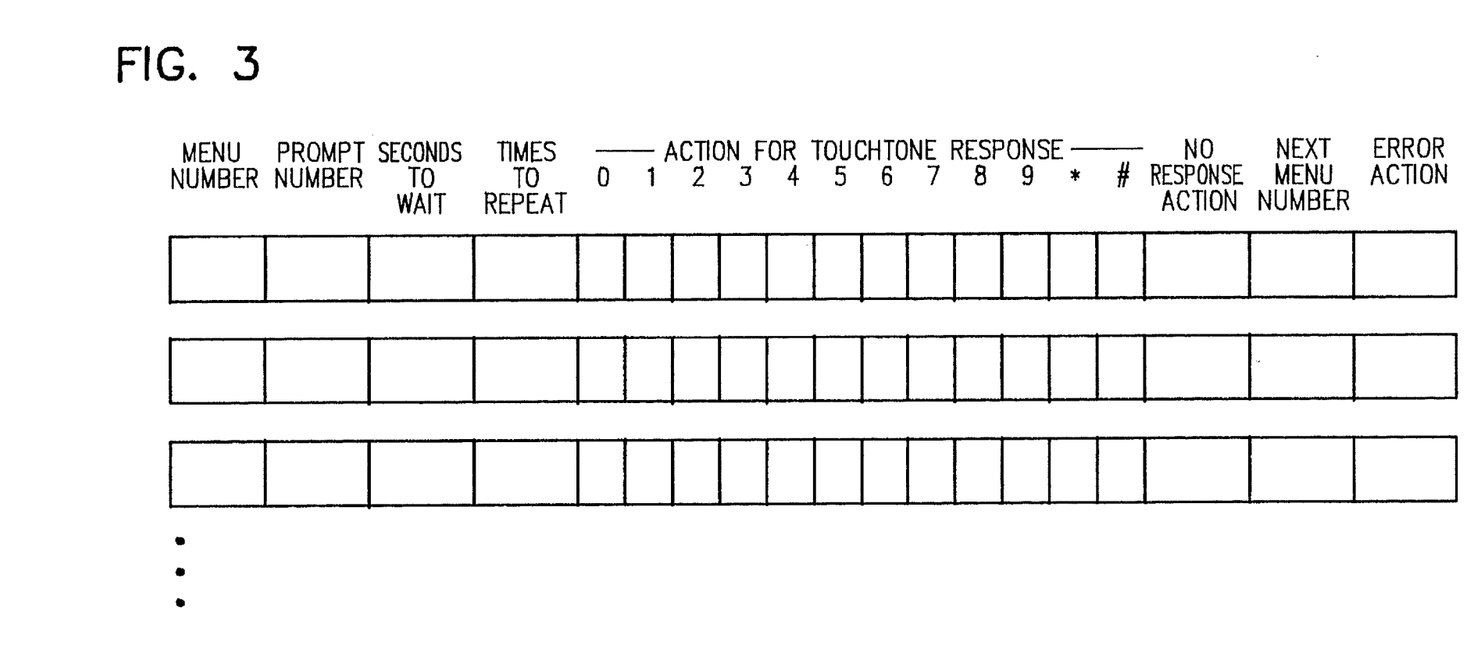
FIG. 3 shows the structure and contents of a table of menus.

The data memory 1 contains a table of uniquely numbered menus 4. Each menu consists of three parts: prompt information, actions to take on user input, and succeeding actions to take.

As shown in Table 2 below, the first part of a menu defines how to play a prompt by specifying a prompt number (retrieved by menus logic at step 11), how many times it should be played (retrieved by menus logic at step 18), and how much time to pause after each playing (retrieved by menus logic at step 15). If a predetermined value, such as a negative number, is specified for the prompt number at menus logic step 12, then the menus logic 6 will bypass playing a prompt. Instead, it will continue on as though no input was received and execute the appropriate action based on no input, step 21.

The second part of a menu defines the handling of possible responses from the user. These possible responses include the pressing of a touchtone key 40 or failure to press a key. In either case, the user's response must be interpreted at menus logic step 21. To each of these possible responses, the menu defines an action, in the form of a menu number, a feature code, or "quit", to be executed for that particular response. If the action is a menu number, which is checked at step 24, then the logic will branch to that new menu and continue processing from there. However, if the action is a feature code, then the logic steps of the features logic 5 defined by the feature code will be taken at step 25.

Features perform specific actions outside of the menus logic 6. Features may perform simple, invisible operations based upon the user's response; or they may perform further interaction with the user to gather data or perform multiple operations. A feature is also capable of "returning" two possible states of completion: success or failure. The two states of feature completion may also be used to "branch" to another menu.

The final section of the menu defines what action to take next on each of two conditions: if the feature completes successfully, step 28, or if it does not complete successfully (error), step 27. If the next action to take on error, step 27, is a menu numbers step 24, then the new menu is interpreted and control continues from that point as defined above. If the next action to take on errors, step 27, is "quit", step 22, the interface system is exited, step 23. If the feature does not complete successfully, the next action to take on error, step 27 may be another feature code which is restricted to certain features that cannot fail to complete successfully.

Menus Editor

The present invention also preferably includes a menus editor 3 to edit the defined menus or create new menus. The menus editor 3 is a stand-alone utility that provides editing functions for individual fields and entire menus of the menu table shown in Table 2 below.

The editor 3 has a screen display interface 41 much like current database spreadsheets; with horizontal rows representing a single menu in the menu table and each column representing a data field in the menu. The intersection of a row and a column is called a "cell". See Table 2 below for an example of the editor interface.

A cell contains data for a specific field of a menu. The data of a cell can only be modified when the cursor is in the cell. Numeric keys 46 may be used to enter data in that field. A change made to a cell is accepted by pressing the 'Enter' key 44 or cursor movement keys 45. Modifications to an existing cell may be cleared and the previous value restored by pressing the 'Esc' key 43.

The first cell of each row is unique. This cell contains the menu number. The cells that follow are data parameters of that menu. The editor provides (and only allows) a special set of editing commands on menu number cells: copy, delete, insert, and move. Selecting one of these commands with the cursor on the menu number cell causes block handling of the menu number and all of the data parameters associated with it.

The editor allows the owner and/or user of the invention to easily design any desired hierarchy of menus, without knowing how to generally program the logic means contained within the device, to create an interface which is particularly suited to the needs of that owner or that user. The editor is used for building and modifying menu designs which are stored in memory. The menu editor is used to edit the defined menus or create new menus. The menu editor allows the user to edit both individual fields and entire menu definition lines of a menu table.

Using the menu editor, a user or owner of the system who has no technical knowledge of programming can easily design or modify a hierarchy of menus, as easily as a computer user can use a spreadsheet. As shown by Table 2, the menu table defines what action will be invoked by the selection of any particular key on the key pad 49 at each menu. Table 1 lists the features that can be specified on each menu line to occur upon the press of a key when that menu is in effect.

The editor allows a user or owner to change the action number in each one of the columns representing touchtones zero through nine plus star and pound sign on the telephone keypad 49. A particular feature to be accomplished can be moved from one menu to another menu.

In place of the preferred form of the editor which is operated with a keyboard 42 and computer screen 41 like a spread sheet, an alternative embodiment of the menu editor can be operated with a user interface consisting of a telephone and an appropriate set of voice prompted menus. The voice prompted menu hierarchy might be constructed using the keyboard and screen menu editor previously described.

Editors which are designed to display on the screen the contents of a computer file, allow modification of the information on the screen, and then allow the modified information to be saved as a computer file are well known to computer programmers. Programmers use many different editors to perform their work and many programmers have written their own editors to serve as useful tools for doing certain steps in programming. A large number of such editors are available as mass market software products. Some such editors are available for copying and distribution without a license or royalties as they have been placed in the public domain or they include a royalty-free license to reproduce and distribute. Also available without a royalty is the source code for more than one editor which a programmer could use as a starting point to create an editor with any particular desired features.

Interface with Database

The preferred embodiment uses the menu system with a telephone voice mail system. In addition to handling routine calls to the voice mail system, the menu system is used to create and maintain an active database that maintains system and user information. This database provides readable/writable storage for system wide and per-user parameters that can be queried by a feature called by one of the menu choices.

Menu systems can be built which are different for each caller. When callers are first connected they are asked to enter touchtones to identify themselves. This identification allows the system to query the database and select an appropriate one of the menu numbers in the system as the first menu for that caller. From this point on, the menus define the structure of the conversation, with the user navigating the menus until he chooses to quit.

Voice Mail Menus

The subscriber is presented with a primary set of menus to handle the basic voice mail functions (set up options, checking messages, leaving messages, reviewing and/or forwarding messages). Although there is no prompt to inform the subscriber, other "speed keys" or "hot-keys" will switch to a second set of menus allowing access to any of the functions immediately and providing an enhanced menu key which causes a prompt to be played that describes the functions of the speed keys.

The primary set of menus provides a sequential hierarchy of basic voice mail functions. These functions can be selected or rejected through a simple "YES" or "NO" by pressing keys such as 1 for Yes and 2 for No. Selecting key 3 will invoke the second set of menus and play the prompt that describes the functions of the speed keys. Speed keys invoke also the second set of menus and provide the user with direct and immediate access to all the options that are presented one after the other in the primary set of menus. Upon completing the speed key function the user has the choice of quitting, entering another speed key, or, by default, returning to the primary set of menus.

The following are examples of how, using the interface system of the present invention, varying sets of menus can be presented and utilized by the end-user. The '1' and '2' keys provide the yes/no responses for the primary set of menus; the '3' key plays a prompt of options available by speed keys; '4', '5', '6', and '7' are speed keys which immediately access a function through the second set of menus; and the '8' key returns to the primary set of menus. The key designations are for illustrative purposes only and could easily be changed without departing from the invention.

|  | Touchtone |
| --- | --- |
| Scenario A: A Subscriber wants to leave a message for another subscriber. | |
| Example A - Primary Set of Menus. | |
| Prompt | |
| "[so and so], remember, 1 for yes and 2 for no." | |
| "You have X new messages. Would you like to check them?" | 2 |
| "Would you like to leave a message?" | 1 |
| "Please enter the extension of the person you'd like to leave a message for." | 100 |
| "[so and so]. Press yes to confirm." | 1 |
| "Okay, I'll record your message now . . . [beep]" | |
| Example B - Speed Set of Menus. | |
| Prompt | |
| "[so and so], remember . . . " | 55 |
| "Please enter the extension of the person you'd like to leave a message for." | 100 |
| "[so and so]. Press yes to confirm." | 1 |
| "Okay, I'll record your message now . . . [beep] | |
| Scenario B: A subscriber wants to change the security code. | |
| Example A - Primary Set of Menus. | |
| Prompt | |
| "[so and so], remember, 1 for yes and 2 for no." | |
| "You have X new messages. 1 Would you like to check them?" | 2 |
| "Would you like to leave a message?" | 2 |
| "Would you like to review or forward old messages?" | 2 |
| "To return to your mailbox press 1, to quit press 2, for setup options press 7." | 7 |
| "Setup options." | |
| "Would you like to change your personal greeting?" | 2 |
| "Would you like to change your delivery options?" | 2 |
| "Would you like to change your security code?" | 1 |
| "Please enter your security code now. Press star when you are done." | 1234* |
| Example B - Speed Set of Menus. | |
| Prompt | |
| "[so and so], remember . . . " | 766 |
| "Please enter your security code now. Press star when you are done." | 1234* |

The feature descriptions, their labels, and the feature codes for the preferred embodiment are listed below:

TABLE 1

| Feature Number | Feature Label | Feature Description |
| --- | --- | --- |
| 101 | VF_CHECKMSGS | Check new messages |
| 102 | VF_SENDMSGS | Send messages |
| 103 | VF_GREETING | Change personal greeting |
| 104 | VF_REVIEW | Review or forward old messages |
| 105 | VF_TRANSFEROPTS | Toggle extension transfer and change number |
| 106 | VF_DELIVERYOPTS | Toggle active message delivery schedules |
| 107 | VF_PERSONALOPTS | Change mailbox voice name |
| 108 | VF_NEWMESSAGES | Check new messages |
| 109 | VF_VOICENAME | Change mailbox voice name |
| 110 | VF_SPELLEDNAME | Change mailbox spelled name |

TABLE 1-continued

| Feature Number | Feature Label | Feature Description |
|---|---|---|
| 111 | VF_ADLISTING | Selects inclusion or exclusion from directory listing |
| 112 | VF_SECURITYCODE | Delete or change mailbox security code |
| 113 | VF_ENROLLEDSUBSCRIBER | Determine if subscriber has been enrolled in mailbox or not |
| 114 | VF_OLDMESSAGES | Review or forward old messages |
| 115 | VF_MSGDELIVERY | Change message delivery schedules |
| 116 | VF_CALLSCREENING | Toggle call screening to the extension |
| 117 | VF_CALLHOLDING | Toggle call holding to the extension |
| 118 | VF_AUTHORDICTATION | Author conversation for dictation feature |
| 119 | VF_TRANSCRIBEDICTATION | Transcriber conversation for dictation feature |
| 120 | VF_ADVANCEDFEATS | Determines if subscriber is allowed access to advanced features |
| 121 | VF_SUBSCRIBERENROLLMENT | Subscriber enrollment process |
| 122 | VF_SYSTEMSTATUS | Plays system status information to system manager |
| 123 | VF_CHANGEMAILBOX | Perform mailbox maintenance |
| 124 | VF_OPENINGREETING | Change schedule modes and greetings |
| 125 | VF_SYSTEMSCHEDULE | Change the system clock and schedules |
| 126 | VF_SYSMGRID | Change the system manager password ID |
| 127 | VF_OPERSTN | Change the extension receiving operator status |
| 128 | VF_SYSTEMNAME | Controls modules that change voice name, spelled name, status |
| 129 | VF_INTROAUTOMSG | Determine if auto-messaging has been activated if so handle message, otherwise perform intro |

A typical memory table for a particular set of menus for the preferred embodiment is listed below:

TABLE 2

| Menu Number | Prompt Number | Seconds to Wait | Times to Repeat | \multicolumn{12}{c}{Action for touchtone response} | No Response Action | Next Menu Number | Error Action |
|---|---|---|---|---|---|---|---|---|---|---|---|---|---|---|---|---|---|---|
| | | | | 0 | 1 | 2 | 3 | 4 | 5 | 6 | 7 | 8 | 9 | * | # | | | |
| \multicolumn{19}{l}{// Subscriber enrollment check, if enrolled go to intro/automsg.} |
| \multicolumn{19}{l}{// Otherwise, go do subscriber enrollment} |
| 1 | -1 | 0 | 0 | 113 | 113 | 113 | 113 | 113 | 113 | 113 | 113 | 113 | 113 | 113 | 113 | 113 | 3 | 2 |
| \multicolumn{19}{l}{// Subscriber enrollment} |
| 2 | -1 | 0 | 0 | 91 | 91 | 91 | 91 | 91 | 91 | 91 | 91 | 91 | 91 | 91 | 91 | 121 | 91 | 1 |
| \multicolumn{19}{l}{// Subscriber introduction (with auto-msging), before the main conversation} |
| 3 | -1 | 0 | 0 | 5 | 5 | 5 | 9 | 10 | 11 | 12 | 13 | 5 | 5 | 8 | 90 | 129 | 4 | 5 |
| \multicolumn{19}{l}{// Subscriber voice mail conversation} |
| 4 | 262 | 0 | 1 | 5 | 5 | 5 | 9 | 10 | 11 | 12 | 13 | 5 | 5 | 8 | 90 | 5 | 8 | 92 |
| 5 | -1 | 0 | 0 | 6 | 6 | 6 | 9 | 10 | 11 | 12 | 13 | 6 | 6 | 8 | 90 | 101 | 6 | 92 |
| 6 | 24 | 5 | 2 | 7 | 102 | 7 | 9 | 10 | 11 | 12 | 13 | 7 | 7 | 8 | 90 | 8 | 7 | 92 |
| 7 | -1 | 5 | 2 | 8 | 8 | 8 | 9 | 10 | 11 | 12 | 13 | 8 | 8 | 8 | 90 | 104 | 8 | 92 |
| 8 | 247 | 5 | 2 | 91 | 5 | 91 | 9 | 10 | 11 | 12 | 13 | 91 | 91 | 92 | 90 | 92 | 8 | 92 |
| \multicolumn{19}{l}{// Subscriber hot-key menus} |
| 9 | 248 | 5 | 2 | 8 | 8 | 8 | 9 | 10 | 11 | 12 | 13 | 8 | 8 | 8 | 90 | 8 | 8 | 92 |
| 10 | 255 | 0 | 1 | 108 | 108 | 108 | 9 | 108 | 11 | 12 | 13 | 108 | 108 | 8 | 90 | 108 | 8 | 92 |
| 11 | 256 | 0 | 1 | 102 | 102 | 102 | 9 | 10 | 102 | 12 | 13 | 102 | 102 | 8 | 90 | 102 | 8 | 92 |
| 12 | 257 | 0 | 1 | 114 | 114 | 114 | 9 | 10 | 11 | 114 | 13 | 114 | 114 | 8 | 90 | 114 | 8 | 92 |
| \multicolumn{19}{l}{// Subscriber setup options conversation} |
| 13 | 251 | 0 | 1 | 14 | 14 | 14 | 18 | 19 | 21 | 22 | 23 | 14 | 14 | 8 | 90 | 14 | 14 | 92 |
| 14 | 250 | 5 | 2 | 15 | 103 | 15 | 18 | 19 | 21 | 22 | 23 | 15 | 15 | 8 | 90 | 8 | 15 | 92 |
| 15 | 279 | 5 | 2 | 16 | 115 | 16 | 18 | 19 | 21 | 22 | 23 | 16 | 16 | 8 | 90 | 8 | 16 | 92 |
| 16 | 272 | 5 | 2 | 17 | 112 | 17 | 18 | 19 | 21 | 22 | 23 | 17 | 17 | 8 | 90 | 8 | 17 | 92 |
| 17 | 274 | 5 | 2 | 8 | 128 | 8 | 18 | 19 | 21 | 22 | 23 | 8 | 8 | 8 | 90 | 8 | 8 | 92 |
| \multicolumn{19}{l}{// Subscriber setup options hot-key menus} |
| 18 | 258 | 5 | 2 | 8 | 8 | 8 | 18 | 19 | 21 | 22 | 23 | 8 | 8 | 8 | 90 | 8 | 8 | 92 |
| 19 | 249 | 0 | 1 | 103 | 103 | 103 | 18 | 103 | 21 | 22 | 23 | 103 | 103 | 8 | 90 | 103 | 8 | 92 |
| 20 | 0 | 0 | 0 | 0 | 0 | 0 | 0 | 0 | 0 | 0 | 0 | 0 | 0 | 0 | 0 | 0 | 0 | 0 |
| 21 | 277 | 0 | 1 | 115 | 115 | 115 | 18 | 19 | 115 | 22 | 23 | 115 | 115 | 8 | 90 | 115 | 8 | 92 |
| 22 | 268 | 0 | 1 | 112 | 112 | 112 | 18 | 19 | 21 | 112 | 23 | 112 | 112 | 8 | 90 | 112 | 8 | 92 |
| 23 | 300 | 0 | 1 | 128 | 128 | 128 | 18 | 19 | 21 | 22 | 128 | 128 | 128 | 8 | 90 | 128 | 8 | 92 |
| \multicolumn{19}{l}{// System manager maintenance conversation} |
| 24 | 301 | 0 | 1 | 25 | 25 | 25 | 31 | 32 | 33 | 34 | 35 | 36 | 25 | 30 | 90 | 122 | 25 | 92 |
| 25 | 326 | 5 | 2 | 26 | 123 | 26 | 31 | 32 | 33 | 34 | 35 | 36 | 26 | 30 | 90 | 30 | 26 | 92 |
| 26 | 327 | 5 | 2 | 27 | 124 | 27 | 31 | 32 | 33 | 34 | 35 | 36 | 27 | 30 | 90 | 30 | 27 | 92 |
| 27 | 328 | 5 | 2 | 28 | 125 | 28 | 31 | 32 | 33 | 34 | 35 | 36 | 28 | 30 | 90 | 30 | 28 | 92 |
| 28 | 339 | 5 | 2 | 29 | 126 | 29 | 31 | 32 | 33 | 34 | 35 | 36 | 29 | 30 | 90 | 30 | 29 | 92 |
| 29 | 380 | 5 | 2 | 30 | 127 | 30 | 31 | 32 | 33 | 34 | 35 | 36 | 30 | 30 | 90 | 30 | 30 | 92 |
| 30 | 329 | 5 | 2 | 91 | 25 | 91 | 31 | 32 | 33 | 34 | 35 | 36 | 91 | 92 | 90 | 92 | 92 | 92 |

TABLE 2-continued

| Menu Number | Prompt Number | Seconds to Wait | Times to Repeat | Action for touchtone response | | | | | | | | | | | No Response Action | Next Menu Number | Error Action |
|---|---|---|---|---|---|---|---|---|---|---|---|---|---|---|---|---|---|
| | | | | 0 | 1 | 2 | 3 | 4 | 5 | 6 | 7 | 8 | 9 | * | # | | | |
| // System manager maintenance menus | | | | | | | | | | | | | | | | | | |
| 31 | 333 | 5 | 2 | 30 | 30 | 30 | 31 | 32 | 33 | 34 | 35 | 36 | 30 | 30 | 90 | 30 | 30 | 92 |
| 32 | 332 | 0 | 1 | 123 | 123 | 123 | 31 | 123 | 33 | 34 | 35 | 36 | 123 | 30 | 90 | 123 | 30 | 92 |
| 33 | 331 | 0 | 1 | 124 | 124 | 124 | 31 | 32 | 124 | 34 | 35 | 36 | 124 | 30 | 90 | 124 | 30 | 92 |
| 34 | 330 | 0 | 1 | 125 | 125 | 125 | 31 | 32 | 33 | 125 | 35 | 36 | 125 | 30 | 90 | 125 | 30 | 92 |
| 35 | 357 | 0 | 1 | 126 | 126 | 126 | 31 | 32 | 33 | 34 | 126 | 36 | 126 | 30 | 90 | 126 | 30 | 92 |
| 36 | 383 | 0 | 1 | 127 | 127 | 127 | 31 | 32 | 33 | 34 | 35 | 127 | 127 | 30 | 90 | 127 | 30 | 92 |

With the power of the menus editor, a user or owner of the system who has no technical knowledge of programming can easily design or modify a set of menus. The menu system itself can be configured to allow any of the prompt recordings to be replaced by the user. Different interfaces can be designed by the user for use with calls coming in from different lines or extensions 48 or upon entry of different personal identification numbers or menu selections. Table 2 is a typical memory table for a twelve-key phone. A similar memory table may be defined for a sixteen-key phone with accompanying changes in the menus editor.

In Table 2, for each row of the menu hierarchy the " cells" that follow within the row after the first cell contain the data parameters for the menu defined by that row within the table. The second column of Table 2 contains an identification of the prompt recording to be played. The third column specifies how many seconds to wait before playing the prompt again if no response is received. The fourth column states how many times the prompt should be played again, in the event of no response, before taking the no response action specified in the third to the last column. The middle portion of each menu line specifies the action that is to be taken by the system as a consequence of each of the twelve possible responses by the user. Each possible action is identified by a number. If the number is a menu number, that menu is invoked. If the number is a feature number, the logic flow jumps out of the menus logic to the logic for that feature and, when the feature is completed, returns to the menus logic. If the feature completes successfully, the second to last cell specifies the menu number that should next be selected by the logic. If the action does not complete successfully (error), the last column specifies the action that should be taken.

As shown in FIG. 2, the logic sequence begins with the specification of a menu number 10. The logic means then gets the prompt number from memory associated with that number 11. If the prompt number is greater than zero 12, the logic means retrieves and plays the prompt 13. It then waits for a response. If no response is received, the logic means retrieves from memory the amount of time to wait before playing the prompt again 15 and then waits the appropriate amount of time. If still no response has occurred, the logic means gets from memory the number of times to repeat the prompt 18 and, if the number is greater than zero, returns to the step of playing the prompt. If the number of the prompt was zero or less, or if a response has occurred, the logic means gets the appropriate action for the response (or no response) from the memory 21. If the appropriate action is to quit 22, the logic means does so. If the action is a menu number 24, the logic means treats this menu number as a new starting point and returns to the beginning of the logic.

If the action is not a menu number (a feature number), the logic means performs the feature. If the feature does not complete successfully, the logic means gets from memory the action to be taken in case of error 27 and returns to the step above of checking to determine whether the action is " quit". If the feature completes successfully, the logic means gets from the memory the next menu number to implement 28 and begins the logic sequence over again with that menu number.

A database provides readable/writable storage for per-user parameters. When a caller identifies himself, the system uses a parameter stored in the database associated with that user to select the first menu to be presented to the caller. The alternative sets of menus are implemented with a single menu table with numerous starting points. If the set of menus is correctly programmed, once a set of menus is entered, it may be impossible to get to another menu from an alternative set of menus in the same table without exiting the system and reentering with a new identification.

While the above description discloses only particular embodiments, it will be readily apparent to persons skilled in the art that numerous changes and modifications can be made to the above described device, including the use of equivalent means, devices, and method steps, without departing from the spirit of the invention.

We claim:

1. A method for communication between a user using a telephone and an electronic logic device, which device includes a table of menus containing a plurality of menus, each of which contains data and not logic instructions, and a logic memory and processor containing logic steps executed by the processor upon invocation of each menu, each menu including specification of actions to be taken by the processor upon receipt of any of a plurality of possible inputs, comprising:

including in the logic steps which are executed upon invocation of a menu a play prompt step and a get response step; and, when the menu is invoked, executing both the play prompt step and the get response step before proceeding to another menu from the table of menus.

2. The method of claim 1, further comprising:

including in a menu in the table of menus a specification of the prompt to be played by the play prompt step.

3. The method of claim 2, further comprising:

including in a menu in the table of menus a specification that no prompt shall be played by the play prompt step.

4. A method for communication between a user using a telephone and an electronic logic device including a user input receiver, a table of menus containing a plurality of menus, and a logic memory and processor containing logic steps executed by the processor upon invocation of each menu, each menu including specification of actions to be taken by the processor upon receipt of any of a plurality of possible inputs, comprising:

(a) including in the logic steps which are executed upon invocation of each menu a play prompt step and a get response step, (b) including in a menu in the table of menus a specification of the prompt to be played by the play prompt step, (c) displaying to the user a representation of the contents of a selected menu of the table of menus, (d) receiving from the user a command to move a cursor on the display and accordingly moving the cursor, (e) receiving from the user a command to change, at the location of the cursor, a specification of a prompt to be played by the play prompt step upon invocation of the selected menu, and (f) changing the specification of the prompt to be played by the play prompt step upon invocation of the selected menu.

5. An apparatus for communication between a user using a telephone and an electronic logic device, which device includes a table of menus containing a plurality of menus, each of which contains data and not logic instructions, and a logic memory and processor containing logic step instructions executed by the logic memory and processor upon invocation of each menu, each menu including specification of actions to be taken by the processor upon receipt of any of a plurality of possible inputs, wherein:

the logic step instructions contained in the logic memory and processor for execution upon invocation of a menu include a play prompt instruction and a get response instruction both of which are executed before proceeding to another menu from the table of menus.

6. The apparatus of claim 5, further comprising:

a menu in the table of menus includes a specification of the prompt to be played by the play prompt instruction.

7. The apparatus of claim 6, further comprising:

a menu in the table of menus includes a specification that no prompt shall be played by the play prompt instruction.

8. The apparatus of claim 6 wherein the electronic logic device further includes a user input receiver, the apparatus further comprising:

(a) means for displaying to the user a representation of the contents of a menu of the table of menus, (b) means for receiving from the user a command to move a cursor on the display and accordingly moving the cursor, (c) means for receiving from the user a command to change, at the location of the cursor, a specification of a prompt to be played by the play prompt instruction upon invocation of the menu and (d) means for making the commanded change to the table of menus.

9. A method of operating an apparatus for communication between a user using a telephone and an electronic logic device which presents to the user a choice of any set of menus from a plurality of sets of menus contained within a table of menus, each of the sets of menus including an end result which is included in each of the other sets of menus, comprising:

(a) establishing a connection to the user, (b) identifying the user and receiving an indication of the user's choice of a set of menus, (c) storing in a memory the identity of the user and, associated therewith, a parameter indicating the set of menus chosen by the user, (d) breaking the connection to the user, and (e) when the user subsequently uses the apparatus, identifying the user, retrieving the parameter stored in the memory, and presenting to the user the set of menus previously chosen by the user.

10. An apparatus for communication between a user using a telephone and an electronic logic device which presents to the user a choice of any set of menus from a plurality of sets of menus contained within a table of menus, each of the sets of menus including an end result which is included in each of the other sets of menus, comprising:

(a) means for establishing a connection to the user, (b) means for identifying the user and receiving an indication of the user's choice of a set of menus, (c) memory means for storing the identity of the user and, associated therewith, a parameter indicating the set of menus chosen by the user, (d) means for breaking the connection with the user, and (e) means for, when the user subsequently uses the apparatus, identifying the user, retrieving the parameter stored in the memory, and presenting to the user the set of menus previously chosen by the user.

11. A method of operating an apparatus for communication between a user using a telephone and an electronic logic device which presents to the user a set of menus from a table of menus containing a plurality of sets of menus, each set of menus containing a set of choices, comprising:

offering to the user a choice of any one set of menus from a plurality of sets of menus contained within a table of menus, each of the sets of menus including an end result of a change to be effected by the electronic logic device while continuing to operate within the chosen set of menus which end result is included in each of the other sets of menus, the set of choices within one of said sets of menus being neither a subset of the set of choices within any other of the sets of menus nor a superset of the set of choices within any other of the sets of menus, and presenting to the user the set of menus chosen by the user.

12. The method of claim 11, wherein the electronic logic device also identifies the user, further comprising:

(a) identifying the user and receiving an indication of the user's choice of sets of menus from the table of menus, (b) storing in a memory the identity of the user and, associated therewith, a parameter indicating the set of menus chosen by the user, and (c) when the user subsequently uses the apparatus, identifying the user, retrieving the parameter stored in the memory, and presenting to the user the set of menus previously chosen by the user.

13. The method of claim 11 further comprising:

receiving from the user a command entered at the telephone, entered while the apparatus is operating with a first set of menus from the table of menus, which command causes the apparatus to follow a second set of menus in place of the first set of menus, said second set of menus containing a set of choices which is neither a subset of the set of choices within the first set of menus nor a superset of the set of choices within the first set of menus.

14. The method of claim 13, further comprising:

receiving from the user a command entered at the telephone, entered while the apparatus is operating with the second set of menus from the table of menus, which command causes the apparatus to return to the first set of menus.

15. The method of claim 13, further comprising:

upon causing the apparatus to follow a second set of menus, causing further information to be presented explaining to the user the options then available.

16. The method of claim 11, further comprising:

receiving from the user a command to perform one of: (1) move and (2) copy a menu from a first set of menus within the table of menus to a second set of menus within the table of menus and modifying the table of menus to accomplish the command.

17. An apparatus for communication between a user using a telephone and an electronic logic device which presents to the user a set of menus from a table of menus containing a plurality of sets of menus, each set of menus containing a set of choices, comprising:

means for offering to the user a choice of any one set of menus from a plurality of sets of menus contained within a table of menus each of the sets of menus including an end result of a change to be effected by the electronic logic device while continuing to operate within the chosen set of menus which end result is included in each of the other sets of menus, the set of choices within one of said sets of menus being neither a subset of the set of choices within any other of the sets of menus nor a superset of the set of choices within any other of the sets of menus, and means for presenting to the user the set of menus chosen by the user.

18. The apparatus of claim 17, further comprising:

(a) means for identifying the user and receiving an indication of the user's choice of sets of menus from the table of menus, (b) memory means for storing the identity of the user and, associated therewith, a parameter indicating the set of menus chosen by the user, and (c) means for, when the user subsequently uses the apparatus, identifying the user, retrieving the parameter stored in the memory, and presenting to the user the set of menus previously chosen by the user.

19. The apparatus of claim 17, further comprising:

switching means for causing the receipt of a command entered at the telephone, entered while the apparatus is operating with a first set of menus from the table of menus, to cause the apparatus to follow a second set of menus in place of the first set of menus, said second set of menus containing a set of choices which is neither a subset of the set of choices within the first set of menus nor a superset of the set of choices within the first set of menus.

20. The apparatus of claim 19, further comprising:

means for causing the receipt of a command entered at the telephone, entered while the apparatus is operating with the second set of menus from the table of menus, to cause the apparatus to return to the first set of menus.

21. The apparatus of claim 19, further comprising:

means, responsive to the switching means, for causing further information to be presented explaining to the user the options then available.

22. The apparatus of claim 17, wherein the electronic logic device also includes means for receiving command input from a user, further comprising:

editing means for performing one of: (1) moving and (2) copying a menu from a first set of menus within the table of menus to a second set of menus within the table of menus upon receipt of a command.

* * * * *